United States Patent
Oh

(10) Patent No.: US 11,442,456 B2
(45) Date of Patent: Sep. 13, 2022

(54) APPARATUS FOR DETERMINING LANE CHANGE PATH OF AUTONOMOUS VEHICLE AND METHOD THEREOF

(71) Applicants: Hyundai Motor Company, Seoul (KR); Kia Motors Corporation, Seoul (KR)

(72) Inventor: Tae Dong Oh, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 223 days.

(21) Appl. No.: 16/838,442

(22) Filed: Apr. 2, 2020

(65) Prior Publication Data

US 2021/0109536 A1    Apr. 15, 2021

(30) Foreign Application Priority Data

Oct. 15, 2019  (KR) .......................... 10-2019-0128056

(51) Int. Cl.
G05D 1/02    (2020.01)
B60W 30/09   (2012.01)
B60W 60/00   (2020.01)
B60W 30/18   (2012.01)

(52) U.S. Cl.
CPC ........... *G05D 1/0214* (2013.01); *B60W 30/09* (2013.01); *B60W 30/18163* (2013.01); *B60W 60/001* (2020.02); *G05D 1/0221* (2013.01); *G05D 2201/0213* (2013.01)

(58) Field of Classification Search
CPC .......... B60W 30/09; B60W 30/18163; B60W 60/001; B60W 30/08; B60W 30/14; B60W 40/072; G05D 1/0088; B60Y 2300/08; B60Y 2300/14; B60Y 2300/18166
See application file for complete search history.

(56) References Cited

U.S. PATENT DOCUMENTS

2020/0139973 A1* 5/2020 Palanisamy ............ G08G 1/167

OTHER PUBLICATIONS

Ma, Liang, et al. "Efficient sampling-based motion planning for on-road autonomous driving." IEEE Transactions on Intelligent Transportation Systems 16.4: 1961-1976. (Year: 2015).*
Lavalle, Steven M., "Rapidly-Exploring Random Trees: A New Tool for Path Planning", Technical Report, Oct. 1998, 4 pages.
Ma, Liang, et al., "Efficient Sampling-Based Motion Planning for On-Road Autonomous Driving", IEEE Transactions on Intelligent Transportation Systems, vol. 16, No. 4, Aug. 2015, pp. 1961-1976.

* cited by examiner

*Primary Examiner* — Sze-Hon Kong
*Assistant Examiner* — Ana D Thomas
(74) *Attorney, Agent, or Firm* — Slater Matsil, LLP

(57) ABSTRACT

An apparatus for determining a lane change path of an autonomous vehicle is provided. The apparatus includes a learning device configured to learn lane change paths corresponding to a lane change strategy of the autonomous vehicle, and a controller configured to interwork with the learning device to extract at least two lane change paths corresponding to the lane change strategy among a plurality of lane change paths in a drivable area of the autonomous vehicle and determine a final lane change path based on properties of the extracted lane change paths.

20 Claims, 19 Drawing Sheets

APPARATUS FOR DETERMINING LANE CHANGE PATH OF AUTONOMOUS VEHICLE AND METHOD THEREOF

CROSS-REFERENCE TO RELATED APPLICATIONS

This application claims priority to Korean Patent Application No. 10-2019-0128056, filed in the Korean Intellectual Property Office on Oct. 15, 2019, which application is hereby incorporated herein by reference.

TECHNICAL FIELD

The present disclosure relates to a technology of determining a lane change path of an autonomous vehicle based on deep learning.

BACKGROUND

In general, deep learning (or a deep neural network), which is a type of machine learning, may be composed of artificial neural networks (ANNs) of several layers between an input and an output. Such an artificial neural network may include a convolutional neural network (CNN) or a recurrent neural network (RNN) corresponding to a structure, a problem and an object to be solved.

The deep learning is used to solve various problems such as classification, regression, localization, detection, segmentation, and the like. In particular, in an autonomous driving system, semantic segmentation and object detection, which can distinguish the location and type of a dynamic and static obstacle, are important.

The semantic segmentation performs segmentation prediction in units of pixels and dividing the image in units of pixels of identical meaning in order to detect an object in an image, and thus, it is possible to not only identify which object is present in the image but also exactly pinpoint the positions of pixels having the same meaning (the same object).

Object detection means classifying and predicting the type of object in an image to find location information of the object by regression prediction of a bounding box, and it is possible to understand not only what type of object is in the image differently from simple classification but also location information of the object.

There has not been proposed a technology of determining a lane change path of an autonomous vehicle based on such deep learning.

SUMMARY

The present disclosure has been made to solve problems occurring in the prior art while advantages achieved by the prior art are maintained intact.

An embodiment of the present disclosure provides an apparatus for determining a lane change path of an autonomous vehicle and a method thereof which can extract at least two lane change paths corresponding to a lane change strategy among a plurality of lane change paths based on deep learning and determine a final lane change path based on properties of the extracted lane change paths, so that it is possible to allow the autonomous vehicle to be driven along the lane change path optimized for a driving situation changing in real time, thereby improving the driving stability.

Technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, an apparatus for determining a lane change path of an autonomous vehicle includes a learning device that learns lane change paths corresponding to a lane change strategy of the autonomous vehicle, and a controller that interworks with the learning device to extract at least two lane change paths corresponding to the lane change strategy among a plurality of lane change paths in a drivable area of the autonomous vehicle and determine a final lane change path based on properties of the extracted lane change paths.

The controller may generate the plurality of lane change paths based on a drivable area of the autonomous vehicle corresponding to a driving path of a dynamic object and a drivable area of the autonomous vehicle corresponding to a distribution of static objects.

The controller may generate a plurality of lane change paths proceeding to a left side of an obstacle and a plurality of lane change paths proceeding to a right side of the obstacle when the obstacle is located on a lane boundary within the drivable area of the autonomous vehicle. In this case, the controller may extract a lane change path corresponding to the lane change strategy from the plurality of lane change paths proceeding to the right side of the obstacle.

The controller may determine one of a normal lane change, a return from a current lane during lane change, and a return from a target lane during the lane change as the lane change strategy. In this case, the controller may periodically determine a new lane change strategy suitable to a current situation while the autonomous vehicle changes lanes.

The controller may determine a final lane change path based on a collision risk, a path curvature and a path length of each extracted lane change path. In this case, the controller may determine a lane change path having a minimum sum of the collision risk, the path curvature and the path length of each extracted lane change path as the final lane change path, or may determine a lane change path having a minimum average of the collision risk, the path curvature and the path length of each extracted lane change path as the final lane change path.

According to another embodiment of the present disclosure, a method of determining a lane change path of an autonomous vehicle includes learning, by a learning device, lane change paths corresponding to a lane change strategy of the autonomous vehicle, extracting, by a controller interworking with the learning device, at least two lane change paths corresponding to the lane change strategy among a plurality of lane change paths in a drivable area of the autonomous vehicle, and determining, by the controller, a final lane change path based on properties of the extracted lane change paths.

The extracting of the lane change path may include generating the plurality of lane change paths based on a drivable area of the autonomous vehicle corresponding to a driving path of a dynamic object and a drivable area of the autonomous vehicle corresponding to a distribution of static objects.

The extracting of the lane change path may include generating a plurality of lane change paths proceeding to a left side of an obstacle and a plurality of lane change paths proceeding to a right side of the obstacle when the obstacle is located on a lane boundary within the drivable area of the autonomous vehicle, and extracting a lane change path corresponding to the lane change strategy from the plurality of lane change paths proceeding to the right side of the obstacle.

The extracting of the lane change path may include determining one of a normal lane change, a return from a current lane during lane change, and a return from a target lane during the lane change as the lane change strategy. In this case, the determining of the lane change strategy may include periodically determining a new lane change strategy suitable to a current situation while the autonomous vehicle changes lanes.

The determining of the lane change strategy may include determining a lane change path having a minimum sum of a collision risk, a path curvature and a path length of each extracted lane change path as the final lane change path.

The determining of the lane change strategy may include determining a lane change path having a minimum average of a collision risk, a path curvature and a path length of each extracted lane change path as the final lane change path.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
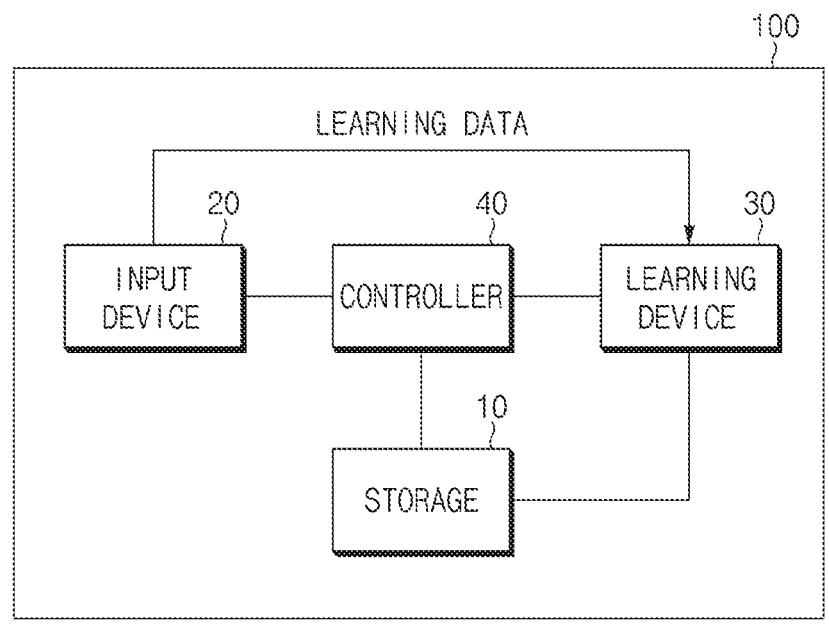
FIG. 1 is a block diagram illustrating a lane change path determination apparatus of an autonomous vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a lane change path determination apparatus of an autonomous vehicle according to an embodiment of the present disclosure.

As shown in FIG. 1, a lane change path determination apparatus 100 of an autonomous vehicle according to an embodiment of the present disclosure may include storage 10, an input device 20, a learning device 30, and a controller 40. In this case, according to a scheme of implementing the lane change path determination apparatus 100 of an autonomous vehicle according to an embodiment of the present disclosure, components may be combined with each other and implemented as one, or some components may be omitted. In particular, the learning device 30 may be implemented to be included in the controller 40 as one function block of the controller 40.

Looking at the respective components, first, the storage 10 may include various logics, algorithms, and programs required in the operations of extracting at least two lane change paths corresponding to a lane change strategy among a plurality of lane change paths based on deep learning and determining a final lane change path based on properties of the extracted lane change paths.

The storage 10 may store, for example, a lane change path model for each driving situation as the learning result of the learning device 30. In this case, the driving situation may include a driving situation of the autonomous vehicle, a road situation, a driving situation of a nearby vehicle, and the like.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

Next, the input device 20 may input (provide) to the learning device 30 the data (learning data) required in the operation of learning a plurality of lane change paths corresponding to each lane change strategy.

In addition, the input device 20 may perform a function of inputting, to the controller 40, data required in the operation of extracting the plurality of lane change paths corresponding to an optimal lane change strategy at a current time point.

Next, the learning device 30 may perform deep learning based on the learning data input from the input device 20 and the learning data input from the controller 40. In this case, the learning data input from the controller 40 may include a plurality of lane change paths in a drivable area of the autonomous vehicle and a lane change strategy optimized for a current driving situation of the autonomous vehicle.

The learning device 30 may perform learning in various ways. For example, the learning device may perform simulation-based learning in the early stage of no learning at all, cloud server-based learning in the middle in which learning is conducted to some extent, and additional learning based on the lane change propensity of an individual after the learning is completed. In this case, a cloud server collects various situation information from a plurality of vehicles performing lane change and infrastructure, and provides the collected situation information to autonomous vehicles as learning data.

Next, the controller 40 performs the overall control such that each component can perform its function. The controller 40 may be implemented in the form of hardware or software, or may be implemented in the form of a combination of hardware and software. Preferably, the controller 40 may be implemented with a microprocessor, but is not limited thereto.

The controller 40 may extract at least two lane change paths corresponding to a lane change strategy among a plurality of lane change paths based on deep learning and determine a final lane change path based on properties of the extracted lane change paths.

For example, the controller 40 may generate the plurality of lane change paths within the area in which the autonomous vehicle is drivable by using rapidly-exploring random Trees (RRT), fast rapidly-exploring random trees (fRRT), and the like.

The controller 40 may extract at least two lane change paths corresponding to the lane change strategy from the plurality of lane change paths based on the deep learning result of the learning device 30, so that the extraction accuracy may be improved as compared with a conventional technique of extracting a lane change path corresponding to a space-based lane change strategy. That is, the controller 40 may improve the spatial freedom of a lane change path.

The controller 40 may determine the final lane change path based on the properties of the extracted lane change paths, such as a collision risk with a nearby vehicle, a path curvature, a path length, and the like.

Figure 2:
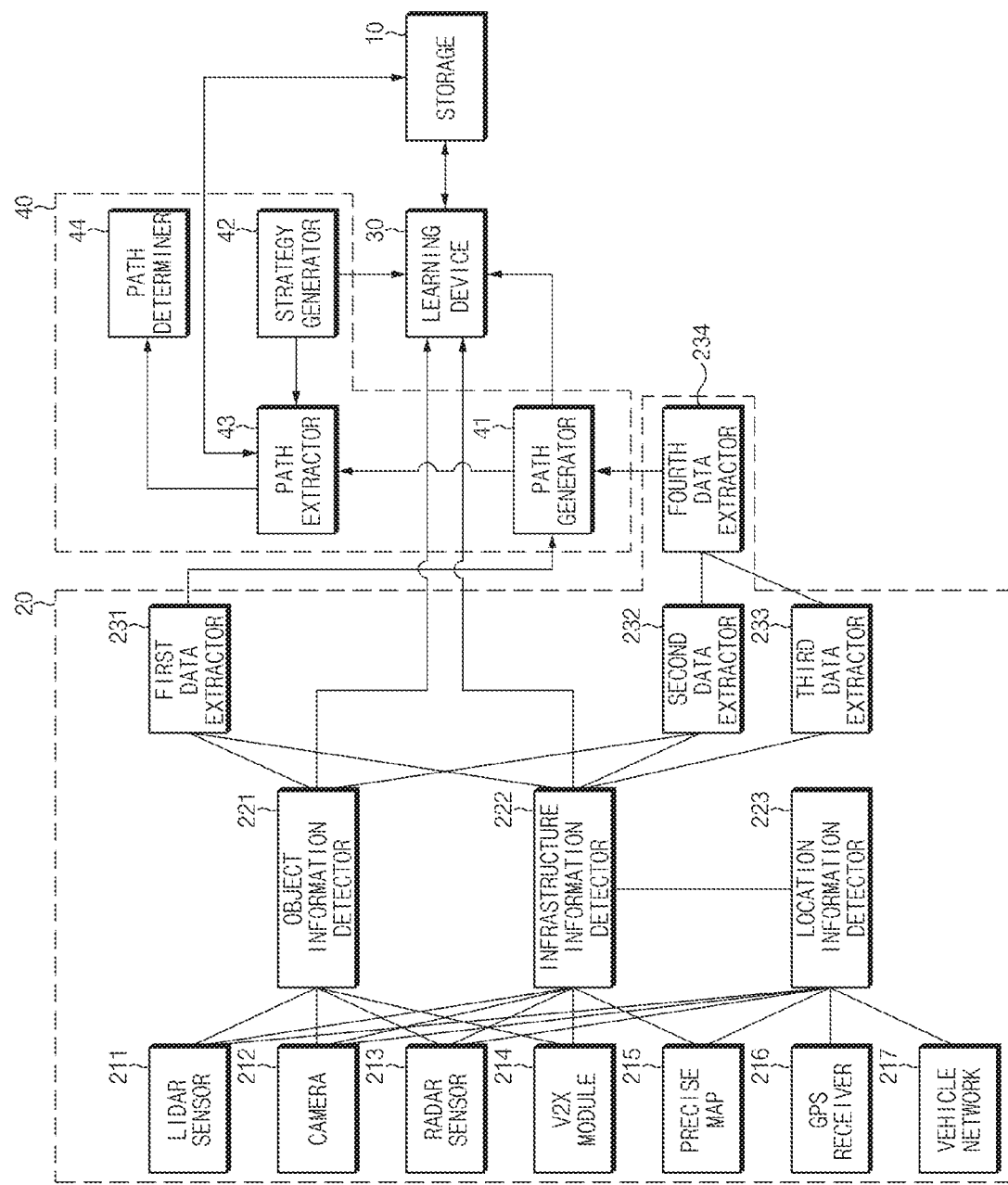
FIG. 2 is a view illustrating a detailed configuration of a lane change path determination apparatus of an autonomous vehicle according to an embodiment of the present disclosure.

FIG. 2 is a detailed configuration diagram of a lane change path determination apparatus of an autonomous vehicle according to an embodiment of the present disclosure.

As shown in FIG. 2, the input device 20 may include a light detection and ranging (LiDAR) sensor 211, a camera 212, a radio detecting and ranging (Radar) sensor 213, a V2X module 214, a precise map 215, a global positioning system (GPS) receiver 216, and a vehicle network 217.

The LiDAR sensor 211, which is a kind of environmental awareness sensor, is mounted on the autonomous vehicle and measures the location coordinates and the like of a reflector based on the time taken to return thereto after shooting a laser beam in all directions while being rotated.

The camera 212 is mounted to the rear of an interior room mirror of the autonomous vehicle to take an image including a lane, a vehicle, a person and the like located around the autonomous vehicle.

The radar sensor 213 receives the electromagnetic wave reflected from an object after shooting an electromagnetic wave to measure the distance to the object, the direction of the object, and the like. The radar sensor 213 may be mounted on the front bumper and the rear side of the autonomous vehicle, recognize a long distance object, and be hardly affected by weather.

The V2X module 214 may include a vehicle-to-vehicle (V2V) module and a vehicle-to-infrastructure (V2I) module. The V2V module may communicate with a nearby vehicle to obtain the location, speed, acceleration, yaw rate, traveling direction, and the like of another nearby vehicle. The V2I module may obtain information about the shape of a road, surrounding structures, traffic lights (e.g., a location, and a lighting state (red, yellow, green, and the like)), and the like from an infrastructure.

The precise map 215, which is a map for autonomous driving, may include information about lanes, traffic lights, signs, and the like for accurate location measurement of the autonomous vehicle and safety enhancement of autonomous driving.

The GPS receiver 216 receives GPS signals from three or more GPS satellites.

The vehicle network 217, which is a network for communication between controllers in an autonomous vehicle, may include a controller area network (CAN), a local interconnect network (LIN), a FlexRay, a media oriented systems transport (MOST), an Ethernet, and the like.

In addition, the input device 20 may include an object information detector 221, an infrastructure information detector 222, and a location information detector 223.

The object information detector 221 detects object information around the autonomous vehicle based on the Lidar sensor 211, the camera 212, the radar sensor 213, and the V2X module 214. In this case, the object may include a vehicle, a person, and an object located on a road, and the object information may include as information about an object, a speed, an acceleration, a yaw rate, a cumulative value of longitudinal acceleration over time, and the like.

The infrastructure information detector 222 detects the infrastructure information around the autonomous vehicle based on the Lidar sensor 211, the camera 212, the radar sensor 213, the V2X module 214, and the precise map 215.

In this case, the infrastructure information includes a shape of a road (lanes, a central divider, and the like), a surrounding structure, a traffic light state, a crosswalk outline, a road boundary, and the like.

The location information detector 223 detects the location information (e.g., location coordinates) of the autonomous vehicle based on the Lidar sensor 211, the camera 212, the radar sensor 213, the V2X module 214, the precise map 215, the GPS receiver 216, and the vehicle network 217. In this case, the location information may include reliability information indicating the accuracy of the location information detection.

In addition, the input device 20 may include a first data extractor 231, a second data extractor 232, a third data extractor 233, and a fourth data extractor 234.

Figure 3A:
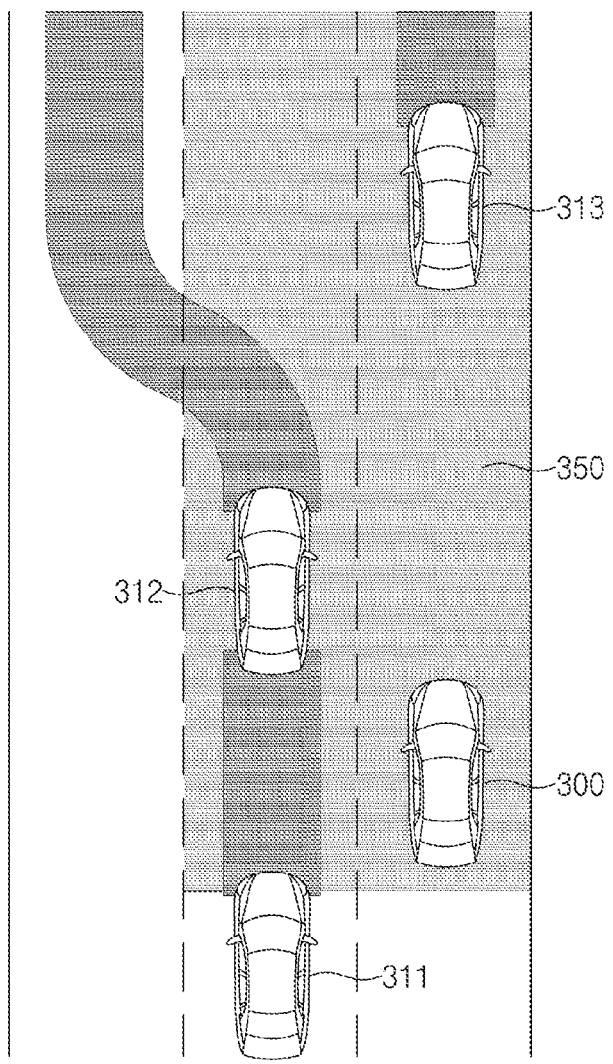
FIGS. 3A to 3C are views illustrating a situation in which the first data extractor included in a lane change path determination apparatus of an autonomous vehicle according to an embodiment of the present disclosure extracts the first group data.
Figure 3B:
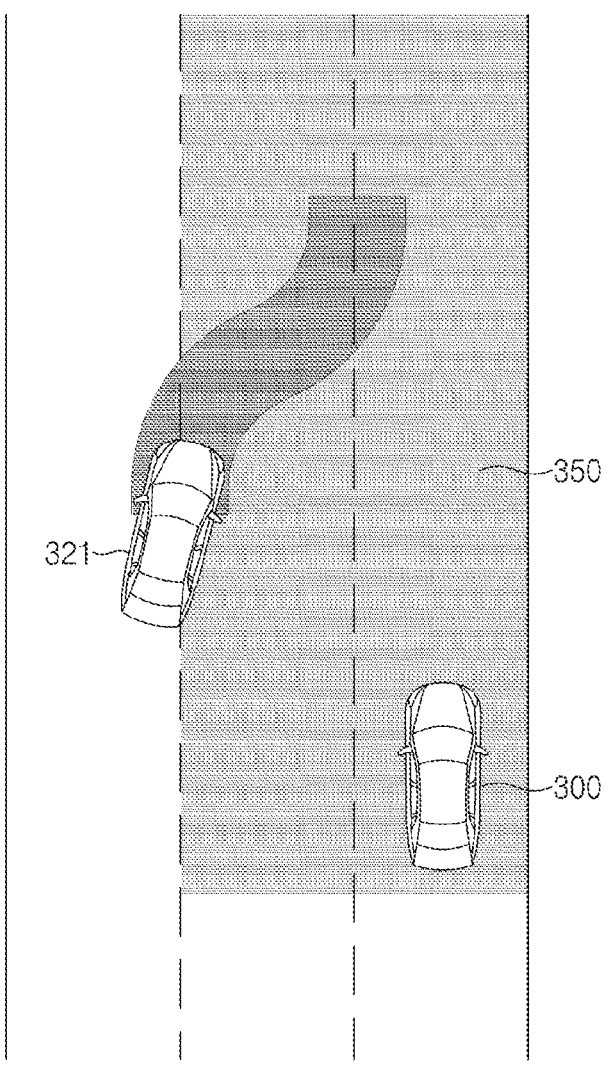
Figure 3C:
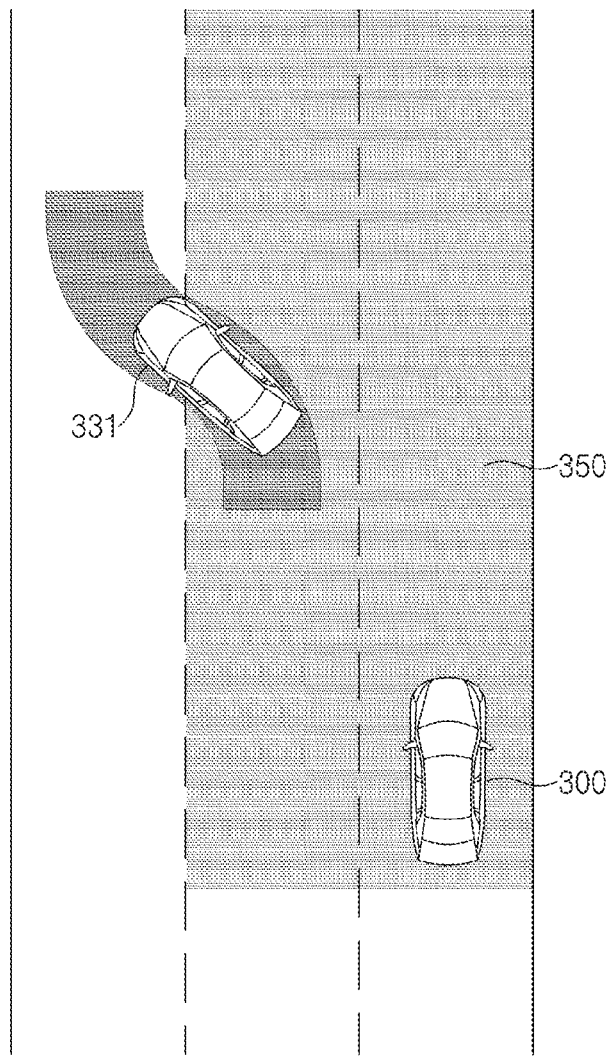

FIGS. 3A to 3C are views illustrating a situation in which the first data extractor included in a lane change path determination apparatus of an autonomous vehicle according to an embodiment of the present disclosure extracts the first group data.

As shown in FIG. 3A, the first data extractor 231 extracts a drivable area (a drivable area based on a driving path of a dynamic object) 350 in which it is impossible to collide with nearby vehicles 311 to 313, based on object information detected by the object information detector 221 and infrastructure information detected by the infrastructure information detector 222, as the first group data. In this case, the first group data may include locations, speeds, accelerations, yaw rates, traveling directions, and the like of the nearby vehicles 311 to 313.

As shown in FIG. 3B, the first data extractor 231 extracts the drivable area 350 in which it is impossible to collide with a nearby vehicle 321, based on the object information detected by the object information detector 221 and the infrastructure information detected by the infrastructure information detector 222, as the first group data. In this case, the first group data may include a location, a speed, an acceleration, a yaw rate, a traveling direction, and the like of the nearby vehicle 321.

As shown in FIG. 3C, the first data extractor 231 extracts the drivable area 350 in which it is impossible to collide with a nearby vehicle 331, based on the object information detected by the object information detector 221 and the infrastructure information detected by the infrastructure information detector 222, as the first group data. In this case, the first group data may include a location, a speed, an acceleration, a yaw rate, a traveling direction, and the like of the nearby vehicle 331.

Figure 4A:
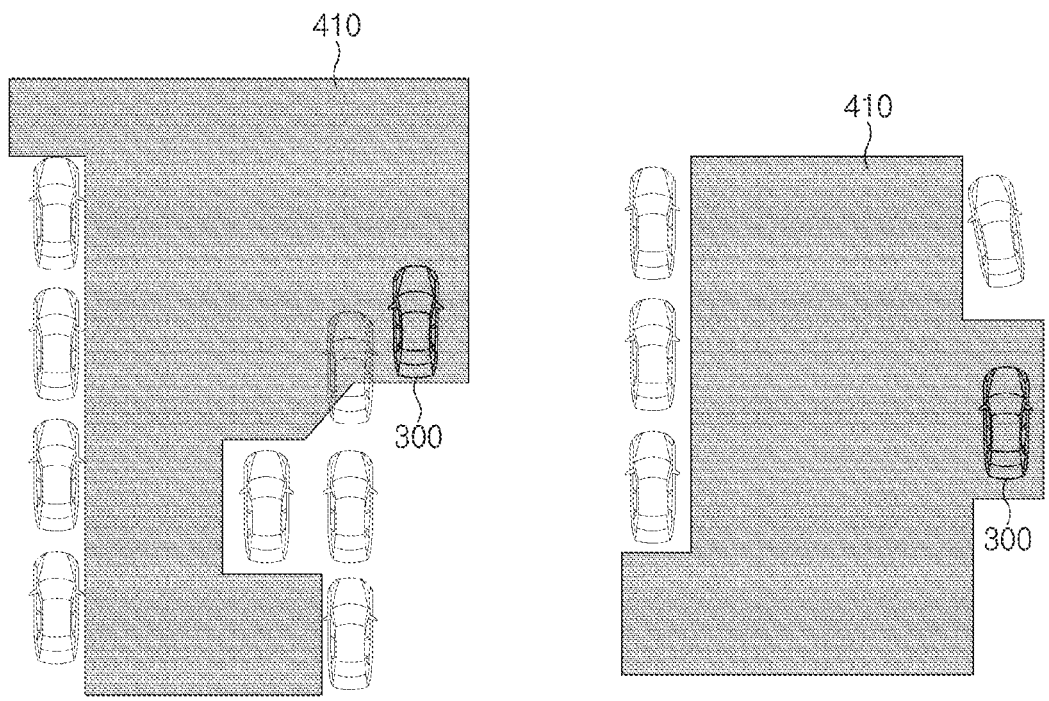
FIGS. 4A and 4B are views illustrating a situation in which the second data extractor included in a lane change path determination apparatus of an autonomous vehicle according to an embodiment of the present disclosure extracts the second group data.
Figure 4B:
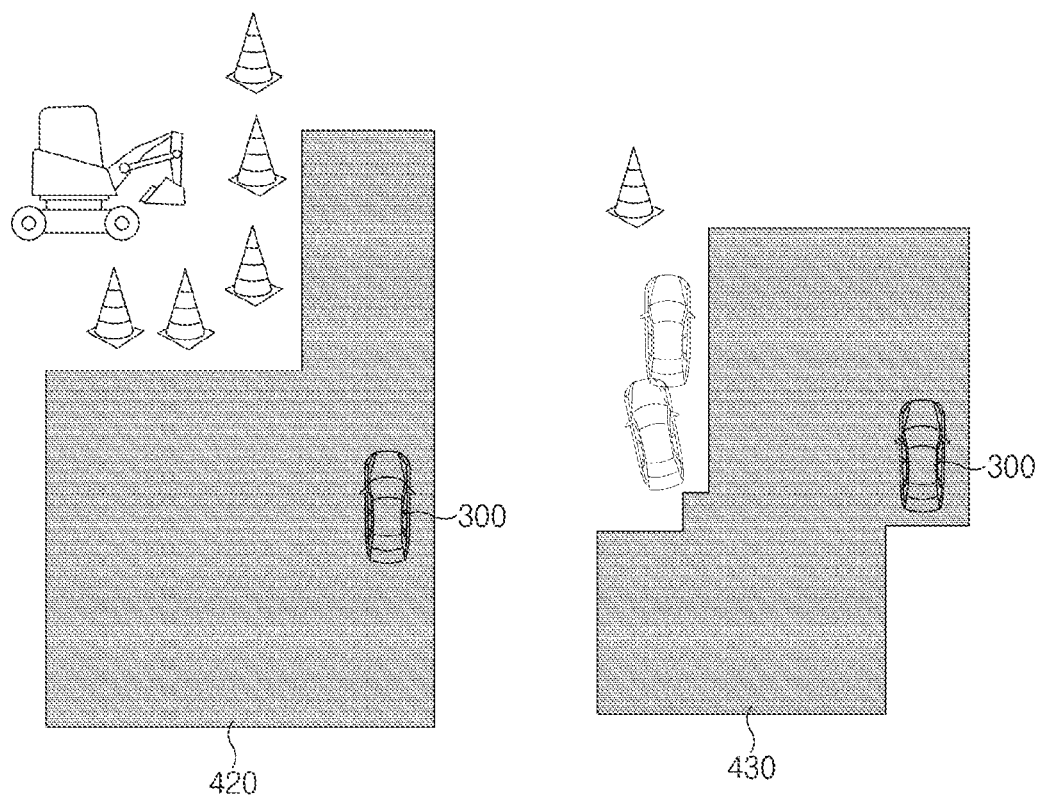

FIGS. 4A and 4B are views illustrating a situation in which the second data extractor included in a lane change path determination apparatus of an autonomous vehicle according to an embodiment of the present disclosure extracts the second group data.

As shown in FIG. 4A, the second data extractor 232 may extract a drivable area 410 corresponding to a distribution of a static object (e.g., a parked vehicle, an obstacle), based on the object information detected by the object information detector 221 and the infrastructure information detected by the infrastructure information detector 222, as the second group data.

As shown in FIG. 4B, the second data extractor 232 may further extract a drivable area 420 corresponding to a construction section and a drivable area 430 corresponding to an accident section, based on the object information detected by the object information detector 221 and the infrastructure information detected by the infrastructure information detector 222, as the second group data.

Figure 5A:
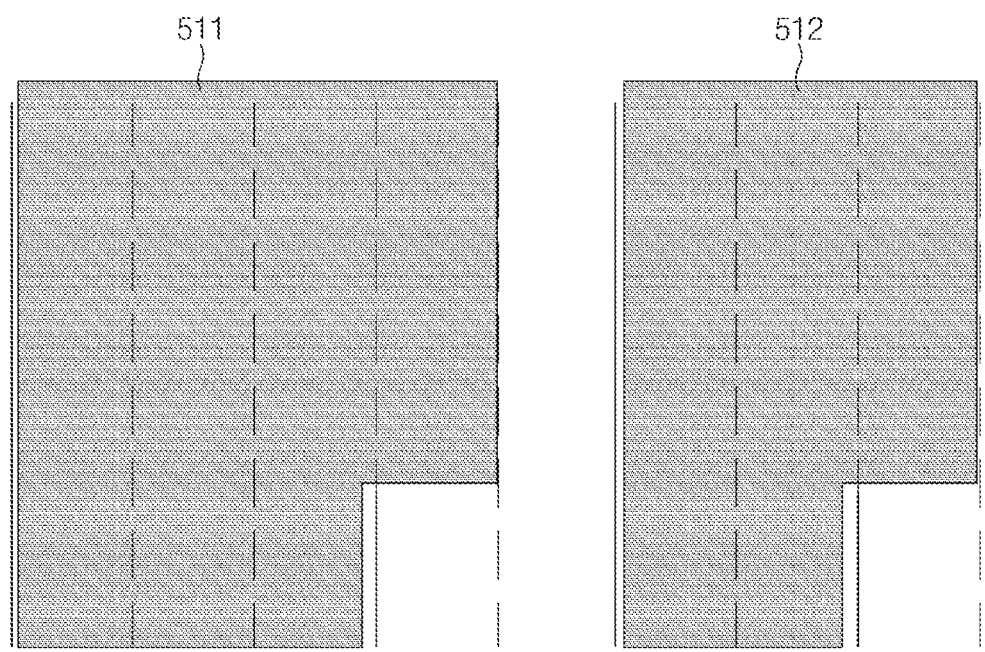
FIGS. 5A and 5B are views illustrating a situation in which the third data extractor included in a lane change path determination apparatus of an autonomous vehicle according to an embodiment of the present disclosure extracts the third group data.
Figure 5B:
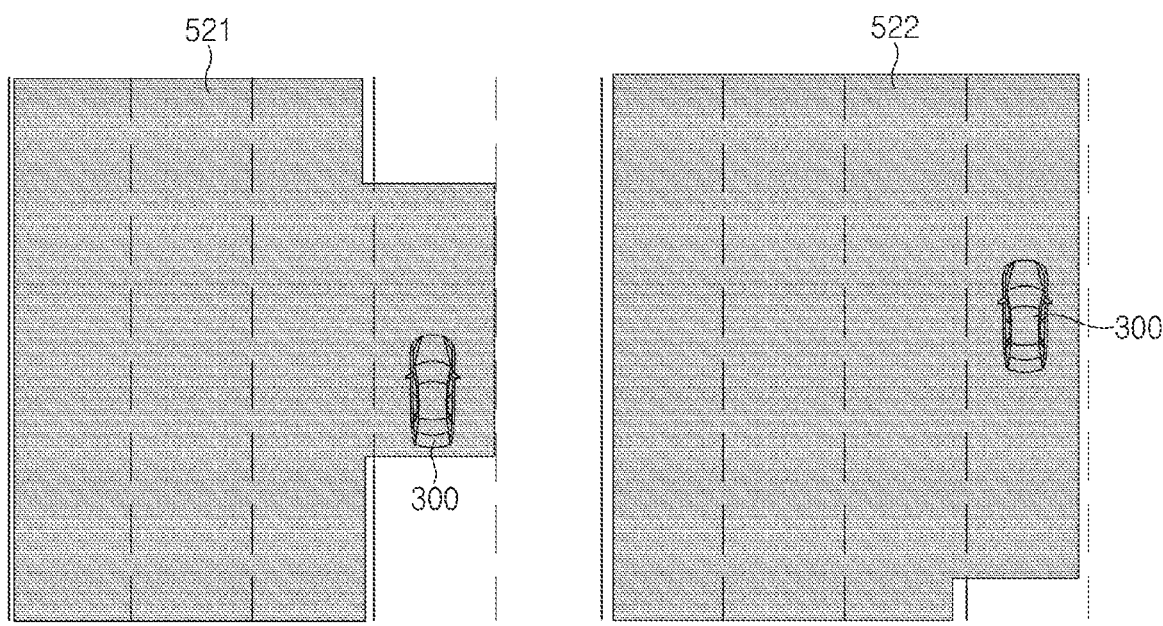

FIGS. 5A and 5B are views illustrating a situation in which the third data extractor included in a lane change path determination apparatus of an autonomous vehicle according to an embodiment of the present disclosure extracts the third group data.

The third data extractor 233 may extract a drivable area corresponding to a road structure based on the infrastructure information detected by the infrastructure information detector 222, as the third group data.

As shown in FIG. 5A, the third data extractor 233 may extract drivable areas 511 and 512 from an image photographed by the camera 212.

As shown in FIG. 5B, the third data extractor 233 may extract drivable areas 521 and 522 based on the location of an autonomous vehicle 300 on the precise map 215.

Figure 6:
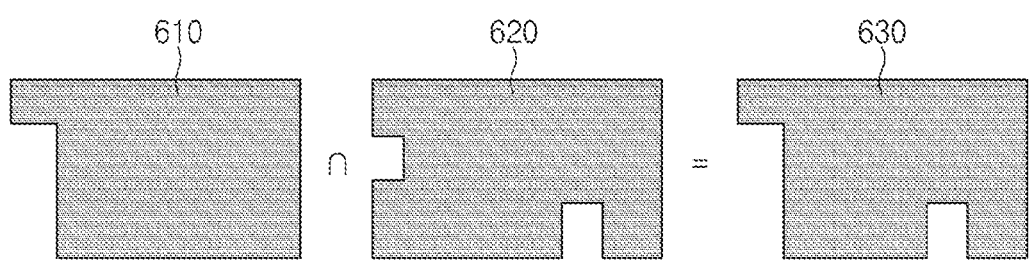
FIG. 6 is a view illustrating a drivable area extracted by the fourth data extractor included in a lane change path determination apparatus of an autonomous vehicle according to an embodiment of the present disclosure as the fourth group data.

FIG. 6 is a view illustrating a drivable area extracted by the fourth data extractor included in a lane change path determination apparatus of an autonomous vehicle according to an embodiment of the present disclosure as the fourth group data.

As shown in FIG. 6, the fourth data extractor 234 may extract an overlap area (a final drivable area) 630 between a drivable area 610 extracted by the second data extractor 232 and a drivable area 620 extracted by the third data extractor 233 as the fourth group data.

Meanwhile, the learning device 30 may receive the object information detected by the object information detector 221, the infrastructure information detected by the infrastructure information detector 222, and the plurality of lane change paths in the drivable area of the autonomous vehicle 300 from the controller 40, and the lane change strategy optimized for the current driving situation of the autonomous vehicle 300 from the controller 40 as learning data, and perform deep learning.

The learning device 30 may use at least one of artificial neural networks such as a convolutional neural network (CNN), a recurrent neural network (RNN), a restricted Boltzmann machine (RBM), a deep belief network (DBN), a deep Q-network, a generative adversarial network (GAN), and a softmax. In this case, at least 10 hidden layers of the artificial neural network, and 500 or more hidden nodes in the hidden layer are preferable, but are not limited thereto.

Meanwhile, the controller 40 may include a path generator 41, a strategy generator 42, a path extractor 43, and a path determiner 44.

Hereinafter, each of the above-described components will be described with reference to FIGS. 7 to 11.

Figure 7:
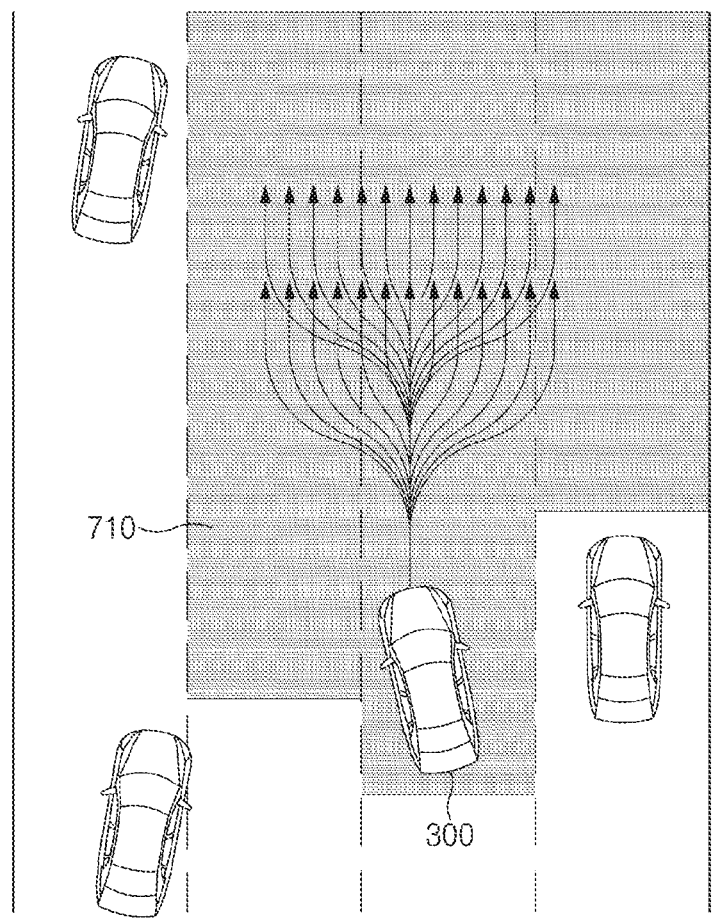
FIG. 7 is a view illustrating a plurality of paths in the drivable area generated by the path generator provided in a lane change path determination apparatus of an autonomous vehicle according to an embodiment of the present disclosure.

FIG. 7 is a view illustrating a plurality of paths in the drivable area generated by the path generator provided in a lane change path determination apparatus of an autonomous vehicle according to an embodiment of the present disclosure.

As shown in FIG. 7, the path generator 41 may generate a plurality of lane change paths in a drivable area 710 of the autonomous vehicle 300, based on the drivable area 350 of the autonomous vehicle corresponding to the driving path of a dynamic object extracted by the first data extractor 231 and the drivable area 630 of the autonomous vehicle corresponding to a distribution of static objects extracted by the fourth data extractor 234.

In general, it is preferable to generate all possible lane change paths in the drivable area 710. In addition, the calculation load of the process of generating a lane change path is not much larger than that of the process of verifying the suitability of a lane change path.

To this end, for example, the path generator 41 may generate as many lane change paths as possible in the drivable area 710 of the autonomous vehicle 300 by using rapidly-exploring random trees (RRT), fast rapidly-exploring random trees (fRRT), and the like.

Figure 8A:
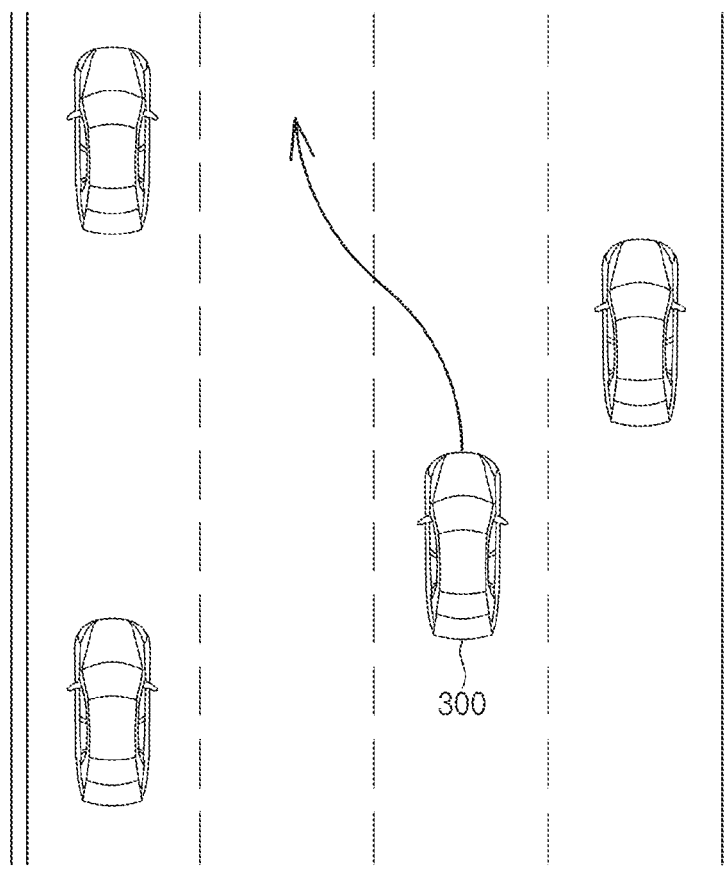
FIGS. 8A to 8C are views illustrating a lane change strategy generated by a strategy generator included in a lane change path determination apparatus of an autonomous vehicle according to an embodiment of the present disclosure.
Figure 8B:
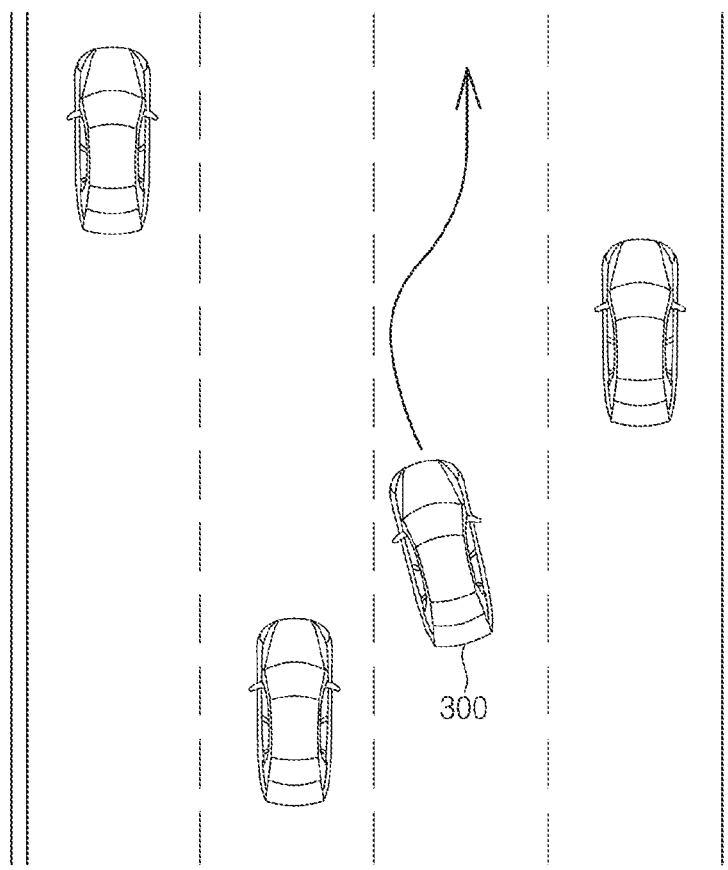
Figure 8C:
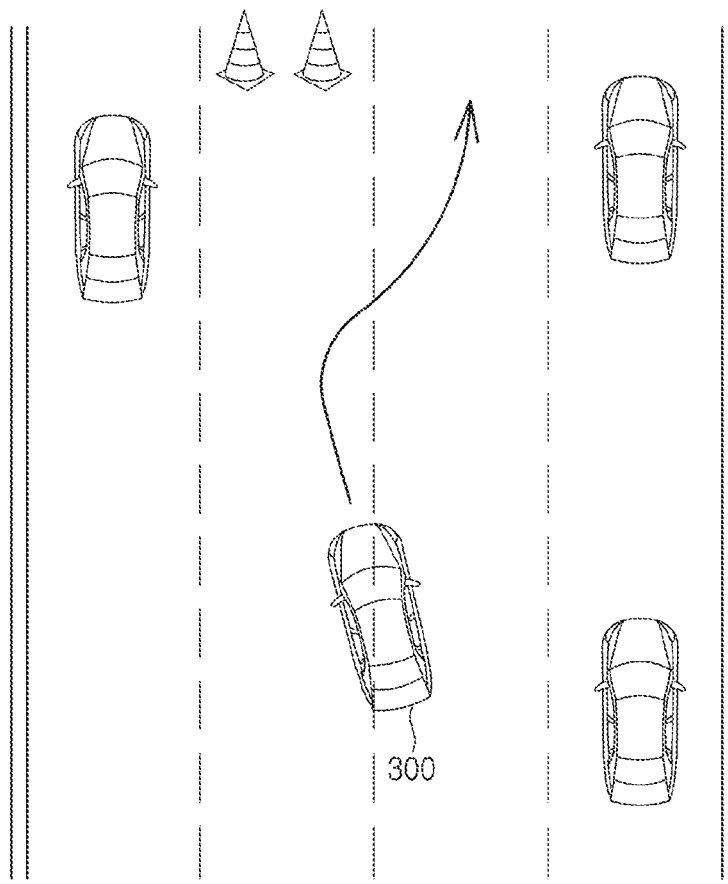

FIGS. 8A to 8C are views illustrating a lane change strategy generated by a strategy generator included in a lane change path determination apparatus of an autonomous vehicle according to an embodiment of the present disclosure.

FIG. 8A illustrates a normal lane change as a first lane change strategy of the autonomous vehicle 300 generated by the strategy generator 42. FIG. 8B illustrates a return to a current lane during lane change as a second lane change strategy of the autonomous vehicle 300 generated by the strategy generator 42. FIG. 8C illustrates a return from a target lane during lane change as a third lane change strategy of the autonomous vehicle 300 generated by the strategy generator 42.

The second lane change strategy of FIG. 8B illustrates a strategy in which the autonomous vehicle does not enter a target lane and continues to be driven in the current lane in a lane change process. The third lane change strategy of FIG. 8C illustrates a strategy in which the autonomous vehicle returns to a current lane after entering a target lane in a lane change process. For reference, because the strategy generator 42 periodically generates a new lane change strategy suitable for the current situation even while the autonomous vehicle 300 changes lanes, the autonomous vehicle 300 may normally change lanes as shown in FIG. 8A, corresponding to an initially generated strategy of returning in a current lane or a strategy of returning from a target lane without returning to the current lane.

In this case, the normal lane change may include various lane change cases such as a lane change to the front of a vehicle driving in a target lane, a lane change corresponding to a separation distance from a vehicle driving in a target lane, a lane change to the rear of a vehicle driving in a target lane, and the like.

In addition, in an embodiment of the present disclosure, although a three lane change strategy has been described as an example, the number of lane change strategies may vary depending on the intention of the designer, and it provides no limit on the present disclosure.

The strategy generator 42 may periodically generate a lane change strategy suitable for a current situation based on a lane change strategy for each situation previously learned.

Figure 9:
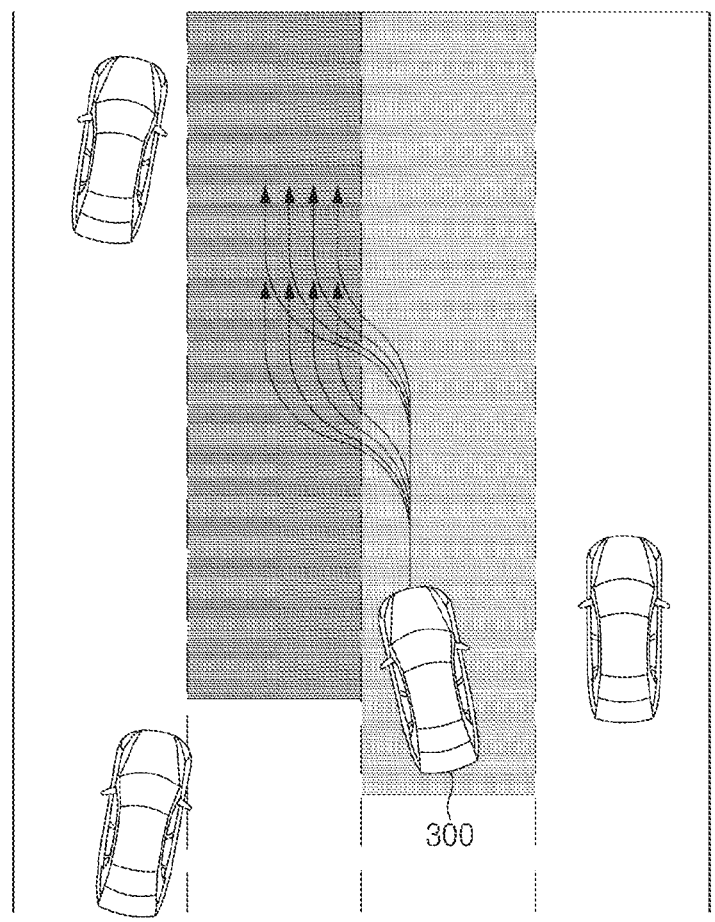
FIG. 9 is a view illustrating a plurality of paths extracted by a path extractor included in a lane change path determination apparatus of an autonomous vehicle according to an embodiment of the present disclosure.

FIG. 9 is a view illustrating a plurality of paths extracted by a path extractor included in a lane change path determination apparatus of an autonomous vehicle according to an embodiment of the present disclosure.

As shown in FIG. 9, the path extractor 43 extracts at least two lane change paths corresponding to the lane change strategy among a plurality of lane change paths generated by the path generator 41, based on the deep learning result of the learning device 30. In this case, the lane change strategy indicates a normal lane change.

Figure 10:
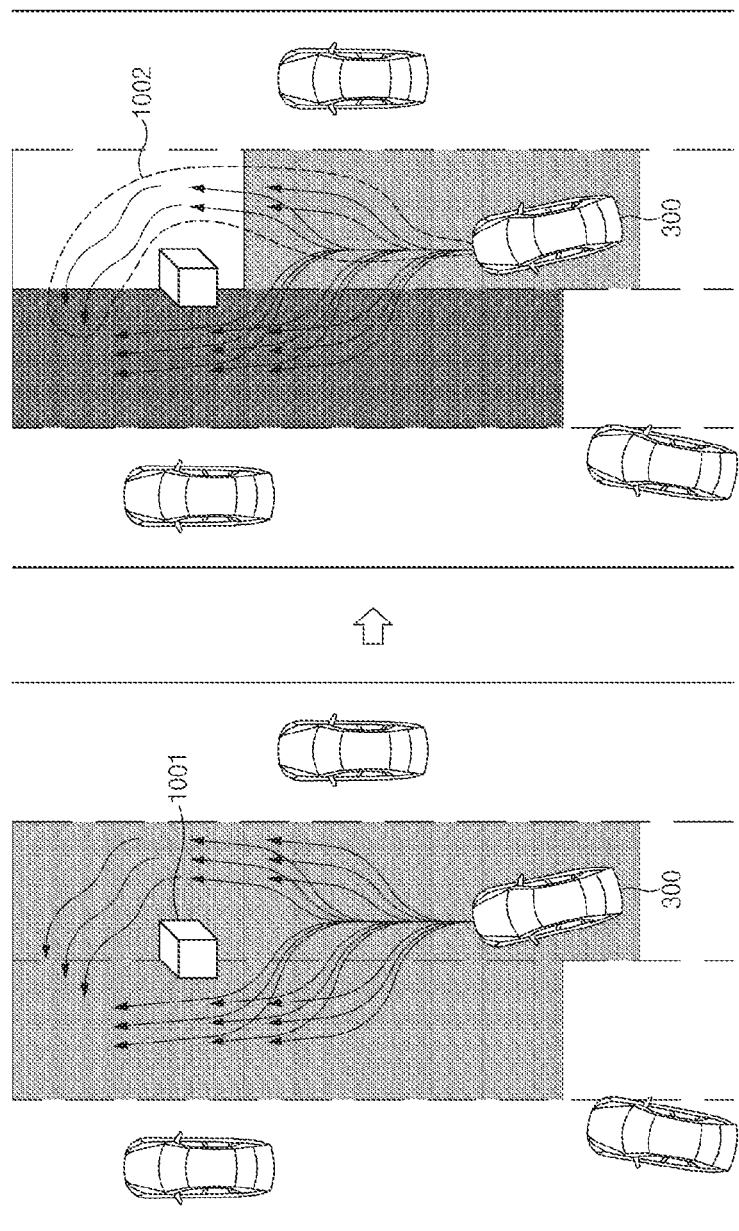
FIG. 10 is a view illustrating a plurality of paths extracted by a path extractor included in a lane change path determination apparatus of an autonomous vehicle according to an embodiment of the present disclosure.

FIG. 10 is a view illustrating a plurality of paths extracted by a path extractor included in a lane change path determination apparatus of an autonomous vehicle according to an embodiment of the present disclosure.

As shown in FIG. 10, because an obstacle 1001 is located on a lane boundary within a drivable area of the autonomous vehicle 300, the path generator 41 generates a plurality of lane change paths which the autonomous vehicle 300 enters at the left side of the obstacle 1001 and a plurality of lane change paths which the autonomous vehicle 300 enters at the right side of the obstacle 1001.

Because the path extractor 43 extracts a lane change path corresponding to a lane change strategy based on deep learning, the path extractor 43 may extract a part 1002 of the lane change paths entering the right side of the obstacle 1001 as the lane change path corresponding to the lane change strategy. In this case, the lane change strategy indicates a normal lane change. For reference, a conventional technique of extracting a lane change path corresponding to a lane change strategy based on a space cannot extract a plurality of lane change paths 1002. That is, all of the plurality of lane change paths entering the right side of the obstacle 1001 are deleted.

Figure 11:
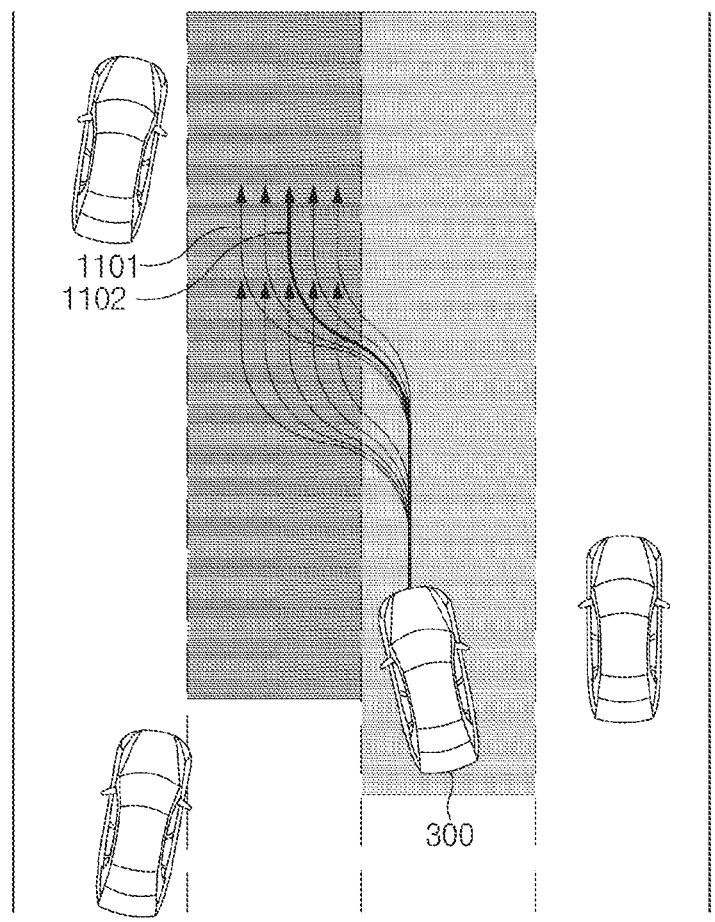
FIG. 11 is a view illustrating a process of determining a final lane change path by a path determiner included in a lane change path determination apparatus of an autonomous vehicle according to an embodiment of the present disclosure.

FIG. 11 is a view illustrating a process of determining a final lane change path by a path determiner included in a lane change path determination apparatus of an autonomous vehicle according to an embodiment of the present disclosure.

As shown in FIG. ii, the path determiner 44 may calculate a collision risk of each path with respect to the plurality of lane change paths extracted by the path extractor 43. In this case, the path determiner 44 may allocate a point based on the number of times that the time to collision (TTC) is less than a reference value as the collision risk. That is, the path determiner 44 may allocate a higher point as the number of times increases. For example, the collision risk of a first lane change path 1101 may be 85 points, and the collision risk of a second lane change path 1102 may be 72 points.

As shown in FIG. 11, the path determiner 44 may calculate a curvature of each path with respect to the plurality of lane change paths extracted by the path extractor 43. In general, a large curvature increases the centripetal force felt by an occupant, so that the ride quality is deteriorated. Therefore, it is preferable to select a path where the curvature is as low as possible. The path determiner 44 may allocate a higher point as the curvature increases. For example, the curvature of the first lane change path 1101 may be 82 points, and the curvature of the second lane change path 1102 may be 35 points.

As shown in FIG. 11, the path determiner 44 may calculate a length of each path with respect to the plurality of lane change paths extracted by the path extractor 43. In general, the longer the lane change path, the longer the lane change time. Therefore, it is preferable to select a shortest lane change path possible. The path determiner 44 may allocate a higher point as the length of the lane change path is longer. For example, the length of the lane change path 1101 may be 78 points, and the length of the lane change path 1102 may be 55 points.

As a result, the path determiner 44 may determine the final lane change path based on the collision risk, the curvature and the length of each lane change path extracted by the path extractor 43.

For example, the path determiner 44 may determine the lane change path having the minimum sum of the collision risk, the curvature and the length of each lane change path extracted by the path extractor 43 as the final lane change path.

As another example, the path determiner 44 may determine a lane change path having a minimum average of the collision risk, the curvature and the length of each lane change path extracted by the path extractor 43 as the final lane change path.

Figure 12:
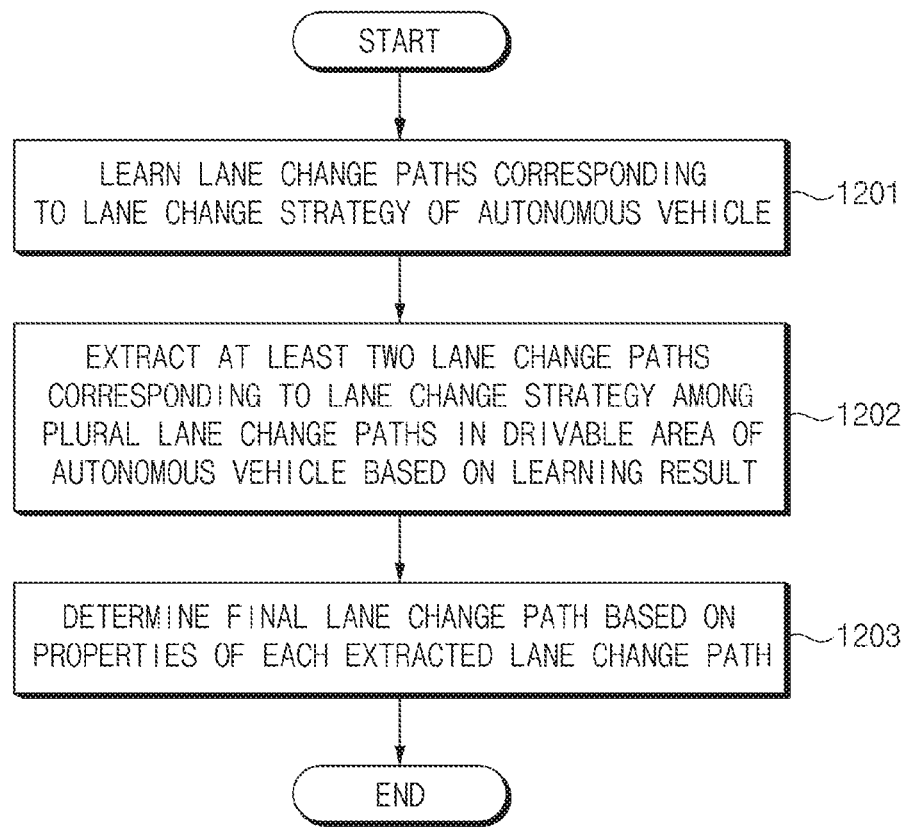
FIG. 12 is a flowchart illustrating a lane change path determination method of an autonomous vehicle according to an embodiment of the present disclosure.

FIG. 12 is a flowchart illustrating a lane change path determination method of an autonomous vehicle according to an embodiment of the present disclosure.

First, in 1201, the learning device 30 learns the lane change paths corresponding to the lane change strategy of the autonomous vehicle.

Then, in 1202, the controller 40 extracts at least two lane change paths corresponding to the lane change strategy from the plurality of lane change paths in the drivable area of the autonomous vehicle in cooperation with the learning device 30. In this case, the controller 40 generates the plurality of lane change paths based on the drivable range of the autonomous vehicle corresponding to the driving path of the dynamic object and the drivable area of the autonomous vehicle corresponding to the distribution of the static objects. In addition, the controller 40 determines one of the normal lane change, the return from the current lane during lane change, and the return from the target lane during lane change as the lane change strategy.

Thereafter, in 1203, the controller 40 determines the final lane change path based on the properties of each extracted lane change path.

Figure 13:
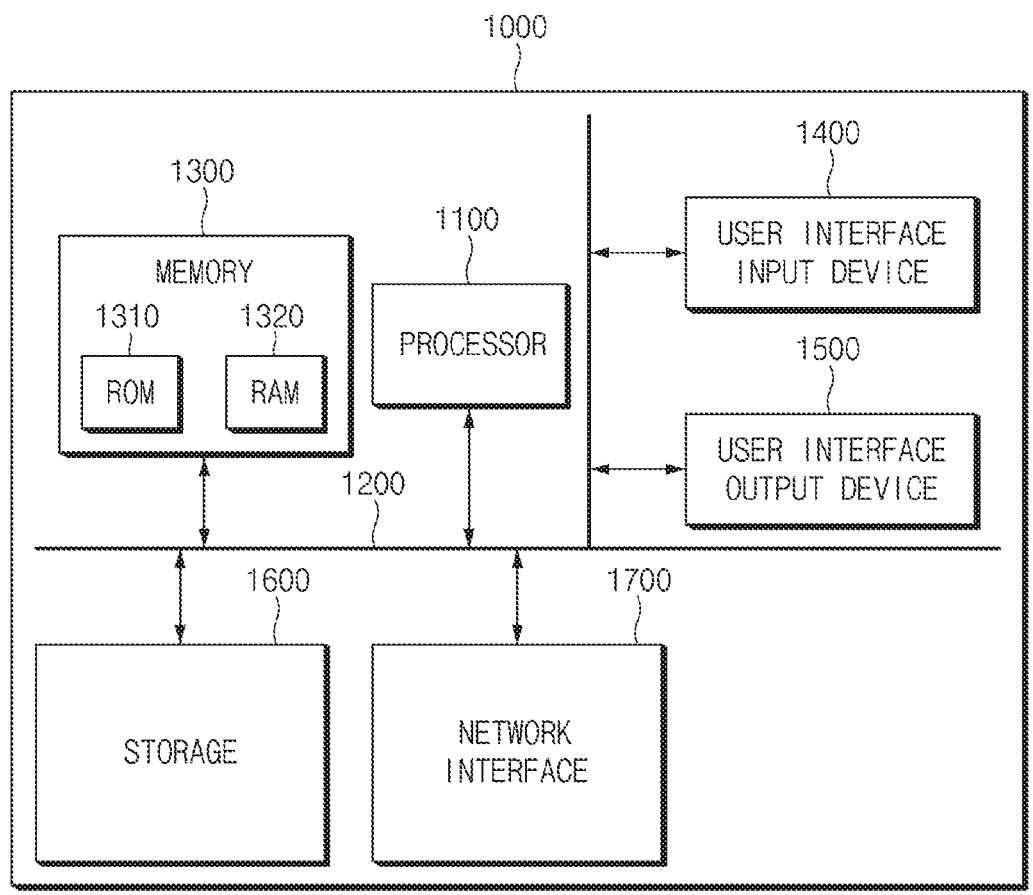
FIG. 13 is a block diagram illustrating a computing system for executing a lane change path determination method of an autonomous vehicle according to an embodiment of the present disclosure.

FIG. 13 is a block diagram illustrating a computing system for executing a lane change path determination method of an autonomous vehicle according to an embodiment of the present disclosure.

Referring to FIG. 13, as described above, the lane change path determination method of an autonomous vehicle according to an embodiment of the present disclosure may be implemented through a computing system. The computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to embodiments of the present disclosure, an apparatus for determining a lane change path of an autonomous vehicle and a method thereof can extract at least two lane change paths corresponding to a lane change strategy among a plurality of lane change paths based on deep learning and determine a final lane change path based on properties of the extracted lane change paths, so that it is possible to allow the autonomous vehicle to be driven along the lane change path optimized for a driving situation changing in real time, thereby improving the driving stability.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An autonomous vehicle comprising:
   a learning device configured to learn lane change paths corresponding to a lane change strategy of the autonomous vehicle; and
   a controller configured to interwork with the learning device to extract at least two lane change paths corresponding to the lane change strategy among a plurality of lane change paths in a drivable area of the autonomous vehicle, to determine a final lane change path based on a minimum combination of collision risk, path curvature and path length of each extracted lane change path as the final lane change path, and to control the autonomous vehicle to follow the final lane change path, wherein the minimum combination is a minimum sum or a minimum average.

2. The autonomous vehicle of claim 1, wherein the controller is configured to generate the plurality of lane change paths based on a first drivable area of the autonomous vehicle corresponding to a driving path of a dynamic object and a second drivable area of the autonomous vehicle corresponding to a distribution of static objects.

3. The autonomous vehicle of claim 1, wherein the controller is configured to generate a first plurality of lane change paths proceeding to a left side of an obstacle and a second plurality of lane change paths proceeding to a right side of the obstacle when the obstacle is located on a lane boundary within the drivable area of the autonomous vehicle.

4. The autonomous vehicle of claim 1, wherein the controller is configured to extract a lane change path corresponding to the lane change strategy from the second plurality of lane change paths proceeding to the right side of the obstacle.

5. The autonomous vehicle of claim 1, wherein the controller is configured to determine one of a normal lane change, a return from a current lane during lane change, and a return from a target lane during the lane change as the lane change strategy.

6. The autonomous vehicle of claim 5, wherein the controller is configured to periodically determine a new lane change strategy suitable to a current situation while the autonomous vehicle changes lanes.

7. The autonomous vehicle of claim 1, further an input comprising a plurality of sensors, the input coupled to the learning device.

8. The autonomous vehicle of claim 7, wherein the sensors comprise a LIDAR sensor, a camera, a radar sensor, and a GPS receiver.

9. The autonomous vehicle of claim 1, wherein the learning device and the controller are implemented by a processing system.

10. A method of operating an autonomous vehicle, the method comprising:
- learning lane change paths corresponding to a lane change strategy of the autonomous vehicle;
- extracting at least two lane change paths corresponding to the lane change strategy among a plurality of lane change paths in a drivable area of the autonomous vehicle;
- determining a final lane change path as a lane change path having a minimum combination of a collision risk, a path curvature and a path length of each extracted lane change path as the final lane change path, wherein the minimum combination is a minimum sum or a minimum average; and
- causing the autonomous vehicle to follow the final lane change path.

11. The method of claim 10, wherein extracting the lane change paths includes:
- generating the plurality of lane change paths based on a first drivable area of the autonomous vehicle corresponding to a driving path of a dynamic object and a second drivable area of the autonomous vehicle corresponding to a distribution of static objects.

12. The method of claim 10, wherein extracting the lane change paths includes:
- generating a first plurality of lane change paths proceeding to a left side of an obstacle and a second plurality of lane change paths proceeding to a right side of the obstacle when the obstacle is located on a lane boundary within the drivable area of the autonomous vehicle; and
- extracting the lane change paths corresponding to the lane change strategy from the second plurality of lane change paths proceeding to the right side of the obstacle.

13. The method of claim 10, wherein extracting the lane change paths includes determining one of a normal lane change, a return from a current lane during lane change, or a return from a target lane during the lane change as the lane change strategy.

14. The method of claim 13, wherein determining the lane change strategy includes periodically determining a new lane change strategy suitable to a current situation while the autonomous vehicle changes lanes.

15. The method of claim 10, wherein the learning is performed by a learning device and the extracting and the determining are performed by a controller, the controller interworking with the learning device.

16. The method of claim 10, further comprising gathering object information, infrastructure information, and location information and using the object information, the infrastructure information, and the location information to learn the lane change paths.

17. The method of claim 16, wherein the object information, the infrastructure information, and the location information are gathered using a plurality of devices, each device of the plurality of devices comprising a device selected from the group consisting of a LIDAR sensor, a camera, a radar sensor, a V2X module, a map, a GPS receiver and a vehicle network.

18. A system for determining a lane change path of an autonomous vehicle, the system comprising:
- a learning device configured to learn lane change paths corresponding to a lane change strategy of the autonomous vehicle; and
- a controller configured to
  - generate a plurality of lane change paths based on a first drivable area of the autonomous vehicle corresponding to a driving path of a dynamic object and a second drivable area of the autonomous vehicle corresponding to a distribution of static objects;
  - interwork with the learning device to extract at least two lane change paths corresponding to the lane change strategy from the plurality of lane change paths; and
  - determine a final lane change path as a lane change path having a minimum combination of a collision risk, a path curvature and a path length of each extracted lane change path as the final lane change path, the minimum combination being a minimum sum or a minimum average; and
  - control the autonomous vehicle to follow the final lane change path.

19. The system of claim 18, wherein the controller is configured to:
- generate a first plurality of lane change paths proceeding to a left side of an obstacle and a second plurality of lane change paths proceeding to a right side of the obstacle when the obstacle is located on a lane boundary within a third drivable area of the autonomous vehicle; and
- extract a lane change path corresponding to the lane change strategy from the second plurality of lane change paths proceeding to the right side of the obstacle.

20. The system of claim 18, wherein the controller is configured to:
- determine one of a normal lane change, a return from a current lane during lane change, and a return from a target lane during the lane change as the lane change strategy; and
- periodically determine a new lane change strategy suitable to a current situation while the autonomous vehicle changes lanes.

* * * * *